United States Patent [19]

Sandvik et al.

[11] Patent Number: 5,005,867
[45] Date of Patent: Apr. 9, 1991

[54] PIVOTALLY MOUNTED LOCKING STATION FOR PASSIVE SAFETY BELT CARRIAGE

[75] Inventors: Lars V. Sandvik; Gert A. Anderzen, both of Vargarda, Sweden

[73] Assignee: General Engineering (Netherlands) B. V., Utrecht, Netherlands

[21] Appl. No.: 380,444

[22] Filed: Jul. 17, 1989

[30] Foreign Application Priority Data

Jul. 18, 1988 [SE] Sweden .............................. 8802664
Sep. 29, 1988 [GB] United Kingdom ................ 8822887

[51] Int. Cl.$^5$ ............................................. B60R 22/06
[52] U.S. Cl. ..................................... 280/804; 280/808
[58] Field of Search ...................... 280/804, 802, 803; 297/469, 473

[56] References Cited

U.S. PATENT DOCUMENTS 4,460,198 7/1984 Sasae et al. ........................... 280/804
4,483,553 11/1984 Nogiwa et al. ...................... 280/803
4,621,825 11/1986 Edwards .............................. 280/804

FOREIGN PATENT DOCUMENTS 839952 6/1960 United Kingdom .
1366911 9/1974 United Kingdom .

Primary Examiner—Charles A. Marmor
Assistant Examiner—Karin Tyson
Attorney, Agent, or Firm—Spencer & Frank

[57] ABSTRACT

A passive safety harness for use in a vehicle comprises a safety belt portion one end of which is attached to a retractor reel and the other end of which is attached to a carriage movable along a rail formed in the door of the vehicle. The carriage carries a tongue which is received in a latching or locking element secured to the vehicle so as to ensure that in an accident situation the end of the belt attached to the carriage is securely retained in the desired position. The locking mechanism comprises a safety belt buckle which is pivotally mounted in position, but which normally occupies a position in which the plane of the buckle is parallel with the plane of the rail to enable the tongue to be easily inserted into the buckle. However, the arrangement is such that in the event that an accident arises the buckle can pivot so that the force applied to the buckle by the safety belt is axial of the buckle, the buckle being designed primarily to withstand forces in this particular direction.

21 Claims, 4 Drawing Sheets

PIVOTALLY MOUNTED LOCKING STATION FOR PASSIVE SAFETY BELT CARRIAGE

BACKGROUND TO THE INVENTION

This invention relates to a passive safety harness for use in a motor vehicle.

It has been proposed to provide a so-called "passive" safety harness for use in a motor vehicle. Such a safety harness is fully automated in that, in response to a signal generated when a person is seated within the motor vehicle (for example, the signal may be generated in response to the door of the motor vehicle being closed) a mechanism is activated which places the various belt portions of the harness in position to restrain the person in the event that an accident arises. Similarly the mechanism can be activated (for example in response to opening of the door) to remove the safety harness from the person sitting in the motor vehicle.

One example of such a safety harness is disclosed in British Patent Specification 1366911.

In this safety harness part of the harness is formed by a lap belt which extends from an inertia reel to a carriage which is movable along a rail formed in the door of the vehicle. The carriage moves to one end of the rail when the harness is to be released and moves to the other end of the rail when the harness is to be closed in a position in which it retains a person within the vehicle. It is desired that the end of the safety belt which is attached to the carriage should remain in this latter position in the event that an accident arises, and thus means are provided in order to secure the carriage, and the end of the belt attached thereto, in the desired position. The particular arrangement used comprises a conventional safety belt buckle which may be mounted on the door of the vehicle and a conventional tongue, dimensioned to be received within the buckle, which is mounted on the carriage. When the carriage moves to its terminal position at the appropriate end of the rail the tongue is inserted into the buckle and thus, in the event that an accident arises, any force generated within the lap belt is transferred, through the carriage to the tongue and from the tongue to the buckle, so that the end of the lap belt connected to the carriage does not move in an undesirable manner. Means are provided to release the conventional safety belt buckle, in British Patent Specification 1366911, for example as the door is opened so that the carriage can then be moved along the rail, or withdrawing the tongue from the buckle. The carriage then moves to the other end of the rail.

The prior art arrangement suffers from two disadvantages.

The first disadvantage is that a conventional safety belt buckle is primarily designed to withstand a force applied thereto by a safety belt, the force being almost precisely aligned with the axis of the buckle. Since the buckle is designed to withstand a maximum force applied axially of the buckle, the buckle can only safely withstand a lesser force which is applied at an inclination to the buckle. If, as in the prior art, the buckle is restrained in a position in which the plane of the buckle is substantially parallel with the plane of the rail in the door, it will be appreciated that the buckle will not be aligned with the direction in which force will be applied to the buckle in an accident situation, since the belt portion attached to the carriage which is connected to the buckle extends substantially horizontally across the lap of the person wearing the harness.

A further disadvantage of the prior art is that if the safety buckle is connected to the door of the vehicle, then the force applied to the buckle during an accident situation is transferred to the door, meaning that the door must be made to be very strong if the door is able to withstand these forces, or further means must be provided to secure part of the door or an element connected to the buckle to the chassis of the vehicle to provide a sufficient degree of strength.

OBJECT OF THE INVENTION

One object of this invention is to provide a safety harness for use in a motor vehicle which incorporates a rail mounted on the door along which a carriage may move, one end of the safety belt portion being attached to the carriage, means being provided to effect a connection between the safety belt and a locking element, the arrangement being such that in the event that an accident arises force from the safety belt will only be applied to the locking element substantially axially of the locking element.

It is a further object of this invention to provide a safety harness for use in a motor vehicle in which a safety belt portion has one end thereof connected to a carriage movable along a rail, an element carried by the carriage being engageable with a locking element, the locking element being mounted in such a way that any force applied to the locking element, under accident conditions, may be transferred readily and easily to the chassis of the vehicle.

BRIEF SUMMARY OF THE INVENTION

According to this invention there is provided a passive safety belt arrangement in a motor vehicle, said arrangement comprising a rail formed in or mounted on the door of the motor vehicle, a carriage movable along the rail, the carriage carrying a tongue, a safety belt forming part of the safety belt arrangement being connected to the tongue, the arrangement further comprising a locking station mounted on the door or the door frame and adapted to receive the tongue when the carriage reaches one end of the rail, said locking station being pivotally mounted in position so that if a significant force is applied to the belt while the tongue is within the locking station, the locking station will pivot so that the axis thereof is substantially aligned with the direction of the force.

Preferably the locking station is in the form of a conventional safety belt buckle.

Conveniently means are provided to hold the locking station in a pre-determined initial position in which the plane defined by the locking station is substantially parallel with the plane defined by the rail.

Advantageously said retaining means are adapted to release the locking station when a severe force is applied to the locking station from the belt via the buckle.

Preferably the locking station is retained in position by means of a clamp having arms terminating with fingers which engage part of the locking station, the fingers being adapted to be straightened or separated from the rest of the clamp when the locking station is subjected to a severe force.

Alternatively the means retaining the locking station in position comprise a spring.

Advantageously means are provided to release the tongue from the locking station in response to a predetermined signal.

Conveniently the means to release the tongue from the locking station comprise a bowden cable operable to actuate a release button provided on the locking station.

In one embodiment the locking station is movable pivotally, upon opening of a door, there being an element which engages the locking station to release the tongue therefrom as the locking station moves pivotally.

Preferably the locking station is pivotally mounted to move about an axis parallel to the plane defined by the door, but perpendicular to the direction of insertion of the tongue into the locking station.

In one embodiment the locking station is pivotally mounted on a support bracket.

Advantageously the support bracket is mounted on the door and presents a forwardly extending arm on which the locking station is mounted.

Preferably a clip having two arms which embrace the locking station initially retains the locking station in position, the arms being frangible or deformable to release the locking station for said pivotal movement when said significant force is applied.

Advantageously the means connecting the tongue to the carriage are adapted to yield when subjected to said significant force.

Preferably the tongue is connected to the carriage by a frangible element designed to break when subjected to said force.

Conveniently the locking station is provided with manually operable means to release the tongue.

Preferably wherein the manually operable means are acted on mechanically when the door is opened the locking station may be mounted on the door or on the door frame.

BRIEF INTRODUCTION TO THE DRAWINGS

DESCRIPTION OF THE PREFERRED EMBODIMENTS

Figure 1:
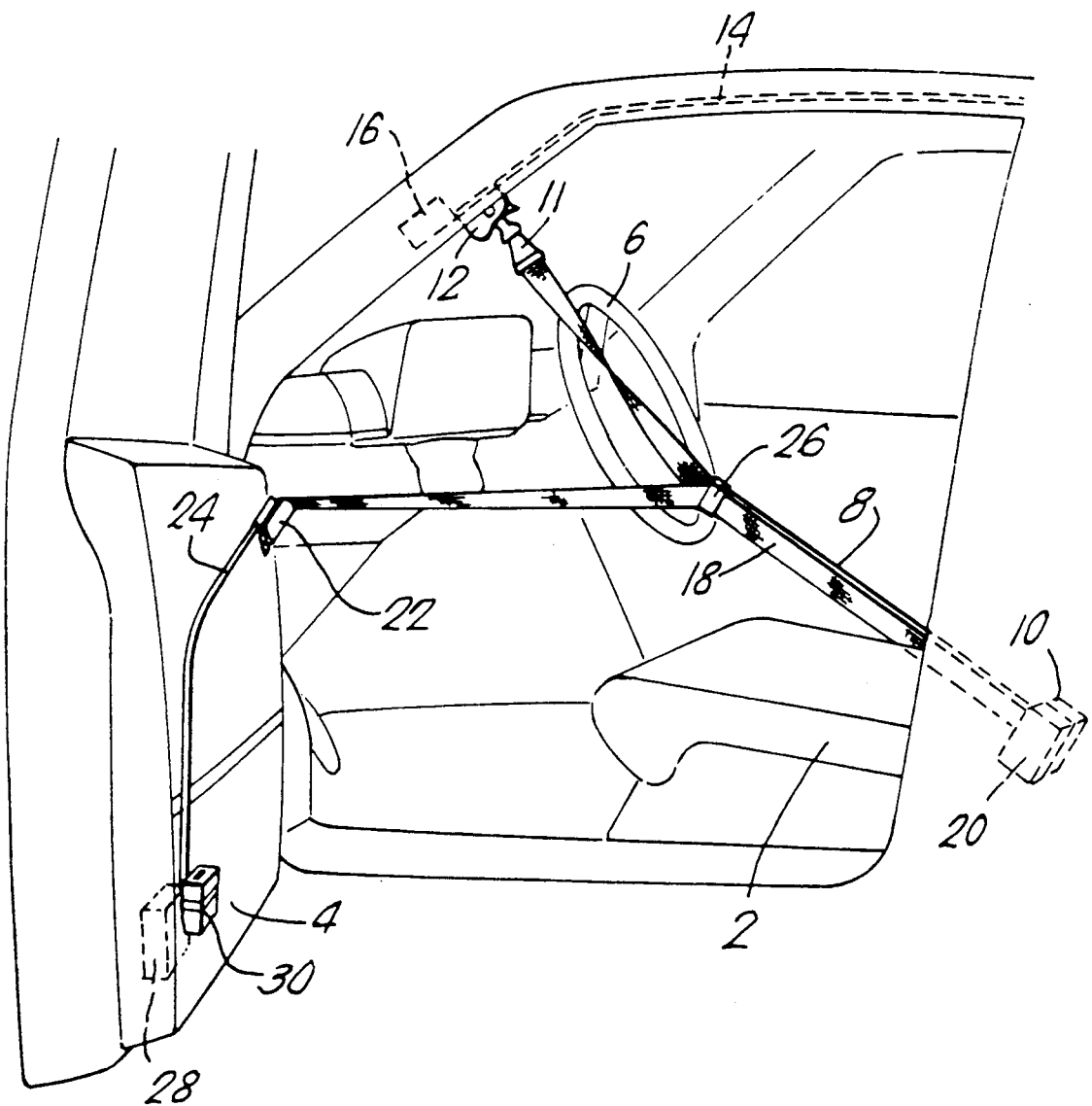
FIG. 1 is a perspective view of part of a motor vehicle incorporating a safety harness in accordance with the invention, illustrating the door of the vehicle in an open condition.

FIG. 1 of the drawings illustrates part of the motor vehicle. A seat 2 to be occupied by the driver of the vehicle is visible, the seat being located adjacent a door 4 by means of which the person may enter the vehicle. The seat is illustrated as being associated with the steering wheel 6 of the vehicle but it is to be appreciated that a safety harness in accordance with the invention may be used to restrain either a driver of the vehicle or the front seat passenger.

A first safety belt 8 extends from a retractor reel 10 which is anchored to the floor of the vehicle adjacent the side of the seat 2 which is remote from the door 4, to a connector 11 which is connected to a carriage 12 which moves along a rail 14 which is formed in the roof of the motor vehicle and extends above the door opening. The carriage 12 is moved along the rail 14 by means of a motor 16.

A second safety belt 18 extends from a retractor 20, which is adjacent the retractor 10, to a carriage 22 which is movable along a rail 24 mounted on the inner face of the door 4. The rail 24 extends substantially diagonally of the door.

The two safety belts 8 and 18 are inter-connected by means of a slideable loop or ring 26, each safety belt being slideable through the ring.

Associated with the lower end of the rail 24 on the interior of the door is a motor 28 adapted to move the carriage 22 along the rail and mounted on the inner face of the door is a locking station 30 in the form of a conventional safety belt buckle adapted to receive a tongue present on the carriage 22 to lock the tongue in position.

It is to be understood that in an initial condition the carriage 12 is at the forward-most end of the rail 14 and the carriage 22 is at the upper forward-most end of the rail 24, thus causing the safety belts 8 and 18 to be lifted away from the seat 2, thus enabling a person to get into or climb out of the motor vehicle. However, in response to a pre-determined signal, for example closing of the door 4, or the switching on of the ignition of the motor vehicle, the carriages 12 and 22 will move to rear positions on their respective rails 14 and 24, thus positioning the safety belts 8 and 18 to embrace a person on the seat 2.

As the carriage 22 moves to the lower end of the rail 24 a tongue present on the carriage 22 engages the buckle 30, so that in the event that an accident arises and force is passed to the belt portion 18, which constitutes a lap belt, the carriage 22 will not move up the rail 24, thus ensuring that the end of the lap belt 18 is maintained in the desired position.

Figure 2:
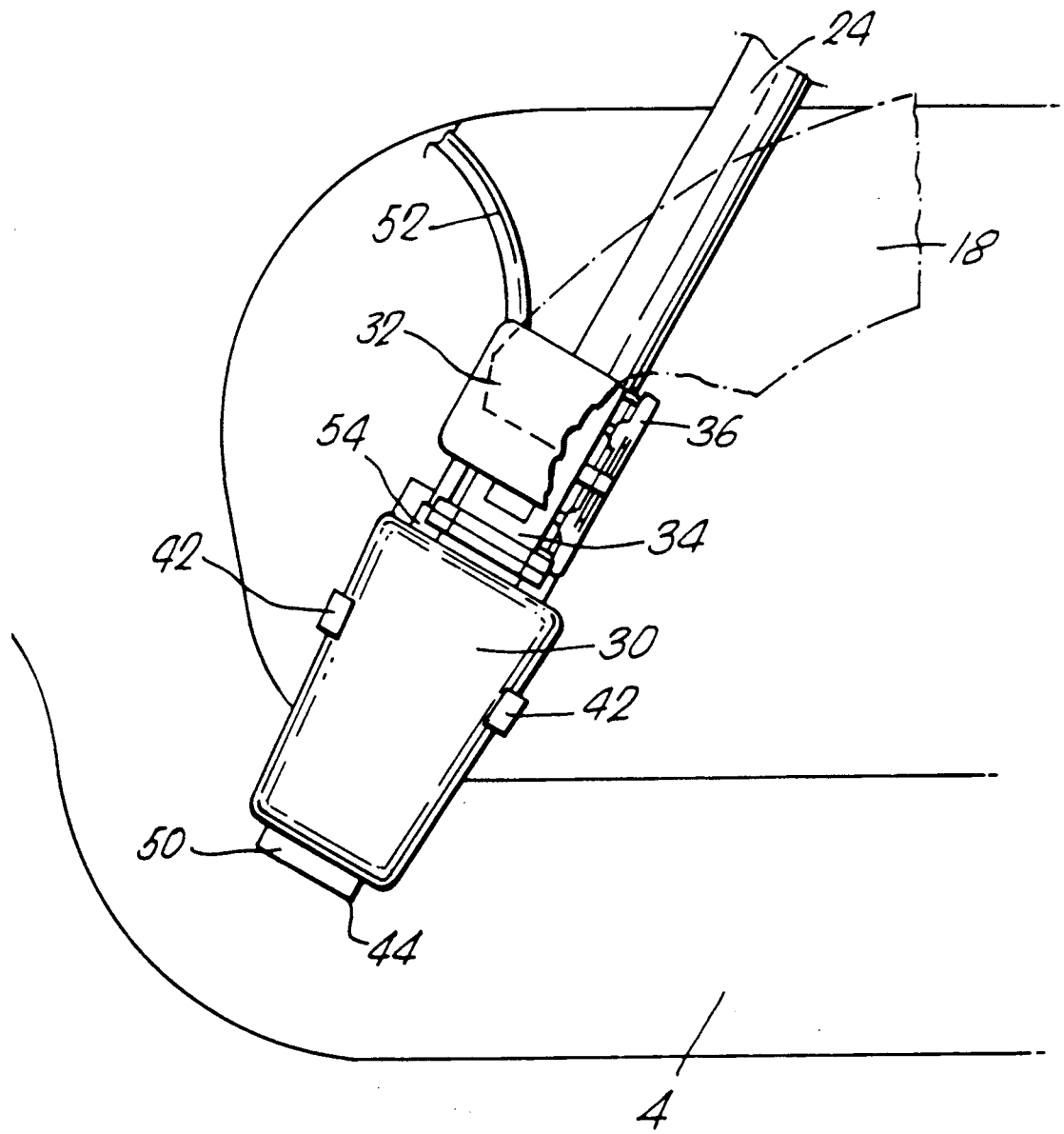
FIG. 2 is an enlarged view of part of the apparatus shown in FIG. 1.
Figure 3:
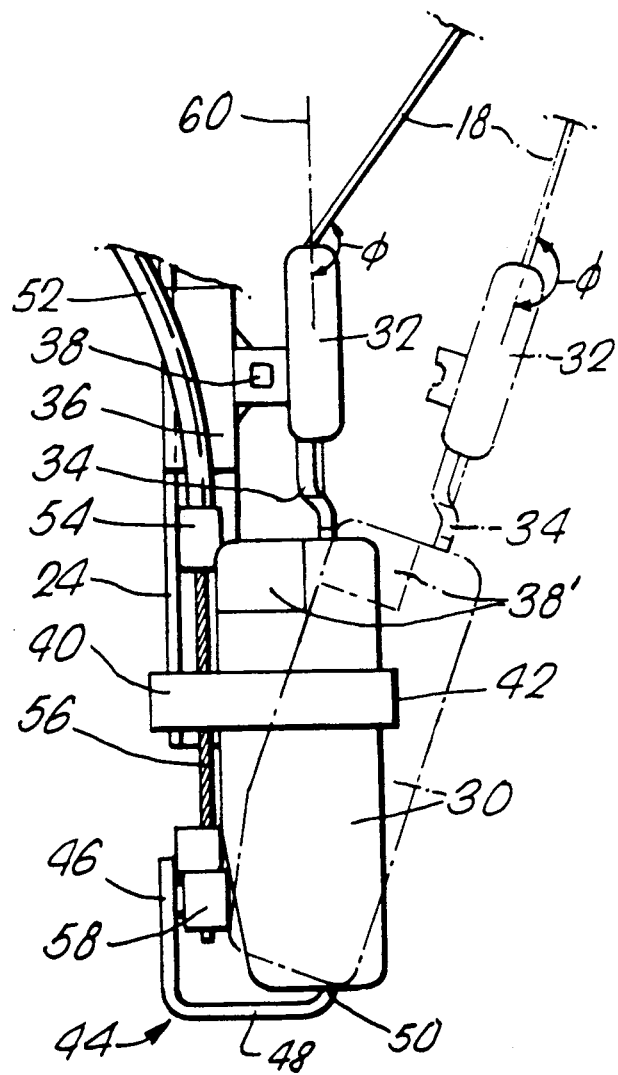
FIG. 3 is a side elevational view of part of the arrangement shown in FIG. 2.

FIGS. 2 and 3 illustrate the arrangement of the buckle 30 in greater detail.

As has been mentioned, the buckle 30 is a conventional seat belt buckle and thus need not be described in detail. Such a buckle is designed to be able to withstand safely a very significant force applied to a tongue which is inserted into and received by the buckle, provided that the force applied to the tongue is substantially aligned with the longitudinal axis of the buckle. The buckle is only able to withstand a lesser force, if the force is applied to the buckle in another direction.

Thus, as will be described hereinafter in greater detail, whilst the buckle is initially positioned so that the plane of the buckle is parallel to the plane of the inner face of the door, to enable the tongue to be readily inserted into the buckle, the buckle is adapted to move in pivotal manner if a significant force is applied to the buckle through the tongue, so that the buckle may then align itself with the direction from which force is applied to the tongue, and the buckle is then in a position in which it can best withstand the load applied to it via the tongue.

As can be seen in FIGS. 2 and 3 the belt portion 18 terminates in a block 32 formed of an appropriate material. (The block 32 and part of the belt 18 is cut away in FIG. 2 for the sake of clarity of illustration). The block 32 is connected to a tongue 34 which is illustrated as being inserted into the buckle 30. The block 32 is connected to a carriage element 36 by means of a weakened plate 38. The weakened plate is in the form of a webb having an aperture formed therein.

The buckle 30 is provided with a manually operable push-button 38' which can be operated to release the tongue 34, from the buckle.

The buckle 30 is embraced by means of a clamp 40 comprising two arms which are connected to the lowermost end of the rail 24 upon which the carriage 36 slides, the arms extending up each side of the buckle and terminating with inwardly directed fingers 42, as can be seen most clearly in FIG. 2. The lower end of the buckle is secured to a support bracket 44. The support bracket 44 has a rear vertical plate 46 which can be secured firmly to the vehicle door 4, as shown in FIG. 2, which supports a horizontally extending lower portion 48 which terminates in an upwardly directed portion 50 which is secured to the base of the buckle 30, in such a way that the buckle 30 may pivot between a position shown in solid lines in FIG. 3 and a position shown in dotted lines in FIG. 3.

A bowden cable 52 is provided, the end 54 of the sleeve of the cable engaging the button 38' which can be manually operated to release the tongue from the buckle, and the end of the cable 56 being secured to a nipple 58 which is connected to the plate 46 forming part of the bracket 44 engaging the lower part of the buckle 30.

It is to be appreciated that the buckle 30 is normally retained, by the clamp 40, in a position in which the plane of the buckle is substantially parallel with the plane of the rail 24 in the door 4. The opening in the buckle 30 is so positioned as to receive the tongue 34 which is carried by the carriage 22 (which incorporates the carriage element 36) as the carriage 22 reaches the lower end of the rail 24. The carriage 22 may be adapted to be moved to the upper position on the rail 24 (as illustrated in FIG. 1) in response to opening of the door. The door opening mechanism may thus be associated with the bowden cable 54, so that, when the door is opened tension is applied to the inner wire or core of the bowden cable, thus forcing the sleeve of the cable 52 to move downwardly, in the region illustrated in FIG. 3, thus pressing the manually operable button 38' inwardly into the buckle 30, thus releasing the tongue 34 from the buckle.

It is to be appreciated, however, that in the event that an accident arises, a significant force will be applied to the belt 18. The belt will thus be placed under tension. As can be seen from FIG. 3 initially the belt 18 will make an angle $\phi$ with the axis 60 defined by the combination of the buckle and the tongue. The resultant force applied by the belt 18 will thus tend to cause the buckle to pivot. If the force exceeds a pre-determined minimum force the mechanically weakened plate 38 breaks, in the region of the aperture, and, simultaneously, the fingers 42 forming part of the clamp 40 straighten (or become broken away from the rest of the clamp if the fingers are designed to operate in this manner) thus permitting the buckle to pivot to the position illustrated in dotted lines in FIG. 3. It can be observed that, when in this condition, the angle $\phi$ is now 180°. Thus the force applied to the buckle from the belt portion 18 is in alignment with the axis defined by the buckle 30 and by the tongue 34. Thus the buckle 30 is in the position in which it is best able to withstand the force applied to it.

Figure 4:
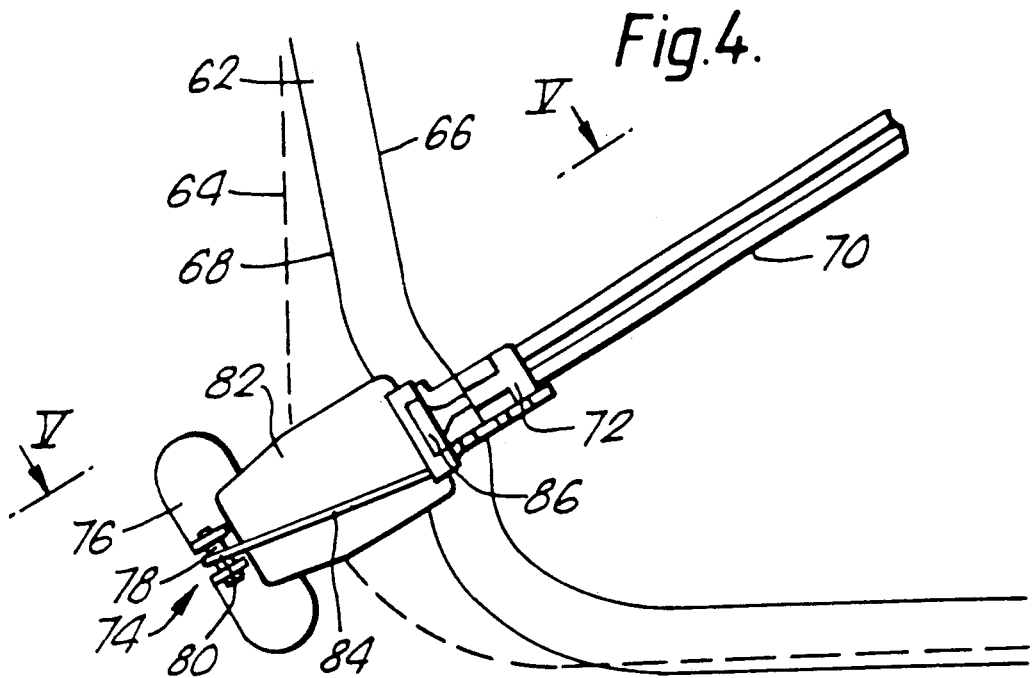
FIG. 4 is a front view, corresponding to FIG. 2, but illustrating an alternative embodiment of the invention.
Figure 5:
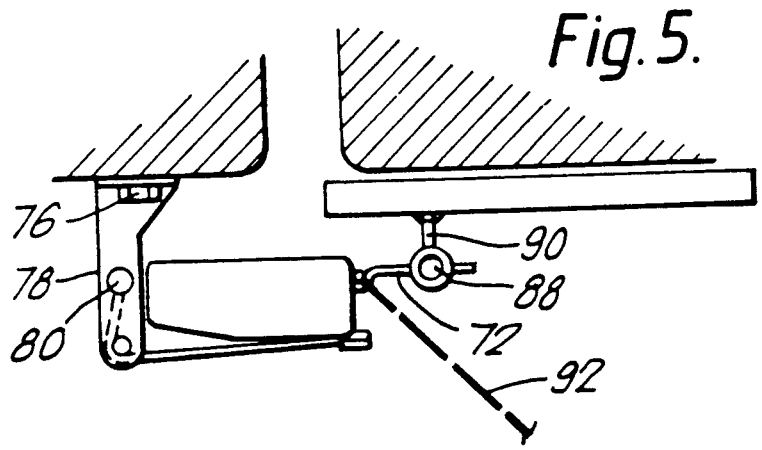
FIG. 5 is a view taken of the arrangement in FIG. 4 along the line VV.
Figure 6:
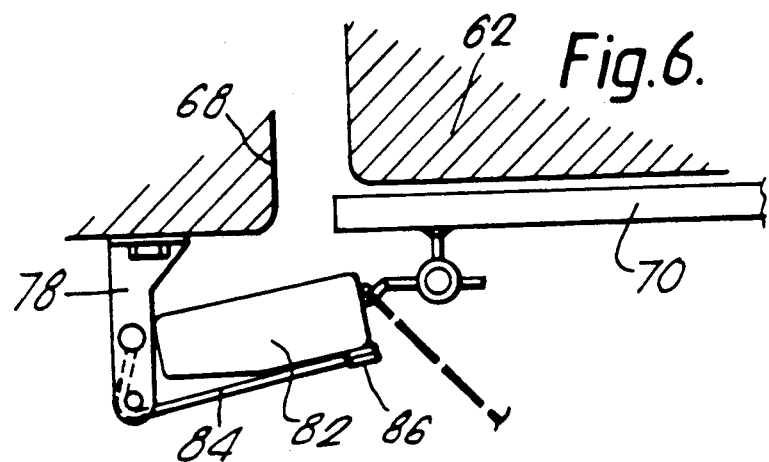
FIG. 6 is a view corresponding to FIG. 5 showing the components in a further position, corresponding to the position occupied when the door of the vehicle is opened.

FIGS. 4 to 6 illustrate a modified embodiment of the invention. In this embodiment the door 62 of a motor vehicle, such as a car has an outer periphery 64, and also has a central raised portion 66 formed on the interior of the door, as is conventional. The door is received, when in a closed condition, within a frame 68 defined by the body of the vehicle and having a contour that corresponds to the contour of the raised portion 66. A seal may be provided between the door and the frame. The illustrated part of the frame is formed by the B-post of the vehicle and part of the door sill of the vehicle.

Mounted on the door 62 and extending generally diagonally across the door 62 is a rail 70. A locking member 72, in the form of a flat tongue, is mounted on a carriage for sliding movement along the rail 70. An appropriate motor is provided to drive the tongue along the rail.

A locking station 74 is provided which is adapted to receive and retain the tongue 72 when the tongue 72 is inserted into the locking station. The locking station 74 is secured to the body of the motor vehicle in the region of the junction between the B-post and the door sill. It will be understood that the locking station may have any appropriate position, depending on the design of any particular embodiment, and may be entirely mounted on the B-post or may be entirely mounted on the door sill. The locking station is always located in the region of the end of the track 70 as formed on the door 62.

In the described embodiment the locking station comprises a bracket 76 that is secured to part of the door frame 68 as defined by the body of the vehicle. The bracket supports outwardly projecting arms 78 which carry a pivot pin 80 on which is mounted a locking mechanism in the form of a conventional seat belt buckle 82. The bracket 76 also carries a spring 84, which passes around an abutment provided at the end of one arm 78 and which engages the buckle 82, tending to retain the buckle in its initial position as illustrated in FIG. 5. The end of the spring 84 is formed to engage with the actuator button 86 of the buckle 82, which can be depressed to release the tongue from the buckle.

As can be seen from FIGS. 5 and 6 the tongue 72 is mounted for pivotal movement about an axis 88 relative to an arm 90 which extends from the carriage that actually engages the track 70. The arm 90 may be made to be relatively weak, or may be mounted on the carriage in a special way, so that if a large force is applied to the tongue which tends to move the tongue away from the carriage, then the tongue will be disengaged from the carriage. A safety belt 92 engages the tongue 72.

The tongue is mounted on the arm 78 in such a way that although the tongue 72 can pivot about the axis 88 the tongue is biassed to a position in which it is parallel with the plane defined by the rail 70.

In use of the described arrangement, when a person initially enters the vehicle, the carriage is at the upper end of the track 70. In response to an appropriate signal, generated for example when the door is closed, or when the ignition is switched on, the carriage is driven down the rail to the position illustrated in FIGS. 4 and 5. The buckle 82 is retained in position by the spring 84 so that as the carriage reaches the end of the track 70 the tongue 72 will be inserted in the open mouth of the buckle, and the buckle will lockingly engage the tongue.

Should an accident arise a great force will be applied to the buckle 82 through the tongue 72. The tongue will be disengaged from the carriage, for example as a result of the arm 90 breaking, and the buckle will pivot about the pivot pin 80 so that the axis of the buckle is aligned with the force being applied to the buckle by the belt 92. In this position the buckle is best able to withstand the applied loads.

If no accident arises, and the person wearing the safety belt opens his door the buckle 82 will pivot in a counter-clockwise direction to the position illustrated in FIG. 6. As the buckle moves the action of the spring 84, which passes around the abutment at the end of the arm 78, is to depress the actuating button 86 of the buckle 82, thus causing the buckle to eject the tongue 72. Thus the door can be opened without the described device being damaged in any way, since the tongue is released in response to the opening of the door, and also upward movement of the carriage is initiated by the opening of the door.

What is claimed is:

1. A passive safety belt arrangement in a motor vehicle having a door and a door frame, comprising:
   a rail in a plane on the door of the motor vehicle;
   a carriage movable along the rail;
   a tongue, the carriage carrying the tongue;
   a safety belt connected to the tongue;
   a locking station pivotally mounted on one of the door and the door frame, the locking station having means for receiving the tongue when the carriage reaches one end of the rail; and
   retaining means for retaining the locking station in a predetermined initial position in a plane parallel to the plane of the rail, the retaining means being responsive to a severe force applied from the belt to the locking station via the tongue, in a direction of force, to release the locking station from the retaining means and pivot the locking station into alignment with the direction of force.

2. An arrangement according to claim 1 wherein the locking station is in the form of a conventional safety belt buckle.

3. An arrangement according to claim 1 wherein the retaining means includes a clamp having arms terminating with fingers which engage part of the locking station, the fingers being adapted to be straightened or separated from the rest of the clamp when the locking station is subjected to the severe force.

4. An arrangement according to claim 1 wherein the retaining means comprises a spring.

5. An arrangement according to claim 1, wherein the locking station is pivotally mounted to move about an axis parallel to the plane defined by the door, but perpendicular to the direction of insertion of the tongue into the locking station.

6. An arrangement according to claim 5 wherein the locking station is pivotally mounted on a support bracket.

7. An arrangement according to claim 6 wherein the support bracket is mounted on the door and presents a forwardly extending arm on which the locking station is mounted.

8. An arrangement according to claim 5 wherein a clip having two arms which embrace the locking station initially retain the locking station in position, the arms being frangible or deformable to release the locking station for said pivotal movement when said significant force is applied.

9. An arrangement according to claim 1 wherein the locking station is provided with manually operable means to release the tongue.

10. An arrangement according to claim 9 wherein the manually operable means are acted on mechanically when the door is opened.

11. An arrangement according to claim 1 wherein the locking station is mounted on the door.

12. An arrangement according to claim 1 wherein the locking station is mounted on the door frame.

13. A passive safety belt arrangement in a motor vehicle having a door and a door frame, comprising:
    a rail in a plane on the door of the motor vehicle;
    a carriage movable along the rail;
    a tongue, the carriage carrying the tongue;
    a safety belt connected to the tongue;
    a locking station pivotally mounted on one of the door and the door frame, the locking station having means for receiving the tongue when the carriage reaches one end of the rail; and
    releasing means, responsive to a first predetermined signal upon opening of the door, for pivoting the locking station and releasing the tongue from the locking station.

14. An arrangement according to claim 13 wherein the releasing means comprise a bowden cable operable to actuate a release button provided on the locking station.

15. An arrangement according to claim 13, further comprising means, responsive to a second predetermined signal, for engaging the tongue with the locking station.

16. An arrangement according to claim 13, further comprising:
    retaining means for retaining the locking station in a predetermined initial position with an longitudinal axis of the locking station aligned in a longitudinal direction and the tongue received in the locking station; and
    means, responsive to a severe force applied to the belt in a direction of force, for pivoting the locking station from the initial position into another position in which the longitudinal axis is aligned with the direction of force.

17. An arrangement according to claim 16 wherein the retaining means retains the locking station in a plane which is substantially parallel with a plane defined by the rail.

18. An arrangement according to claim 17 wherein the retaining means are adapted to release the locking station when the severe force is applied to the locking station from the belt via the buckle.

19. A passive safety belt arrangement in a motor vehicle having a door and a door frame, comprising:
    a rail in a plane on the door of the motor vehicle;
    a carriage movable along the rail;
    a tongue, the carriage carrying the tongue;
    a safety belt connected to the tongue;
    a support bracket in the form of a forwardly extending arm mounted on the door; and
    a locking station pivotally mounted on the arm, the locking station having means for receiving the tongue in a receiving direction when the carriage reaches one end of the rail, the locking station being pivotable about a pivot axis in the plane of the rail, the pivot axis being perpendicular to the receiving direction.

20. An arrangement according to claim 19, further comprising:

retaining means for retaining the locking station in a predetermined initial position with an axis of the locking station aligned in a longitudinal direction and the tongue received in the locking station; and means, responsive to a severe force applied to the belt in a direction of force, for pivoting the locking station from the initial position into another position in which the axis is aligned with the direction of force.

21. A passive safety belt arrangement in a motor vehicle having a door and a door frame, comprising:

a rail in a plane on the door of the motor vehicle;
a carriage movable along the rail;
a tongue;
a frangible element connecting the tongue to the carriage so that the carriage carries the tongue;
a safety belt connected to the tongue; and
a locking station pivotally mounted on one of the door and the door frame, the locking station having means for receiving the tongue when the carriage reaches one end of the rail, the frangible element being breakable in responsive to a severe force applied in a direction of force to the locking station from the belt via the tongue, thereby to release the tongue from the carriage and permit the locking station to pivot into alignment with the direction of force.

* * * * *